US010183713B1

(12) United States Patent
Mohamed

(10) Patent No.: US 10,183,713 B1
(45) Date of Patent: Jan. 22, 2019

(54) ELECTRONIC SECURITY DEVICE FOR A BICYCLE

(71) Applicant: LINKA GROUP LTD., Hong Kong (HK)

(72) Inventor: Mohamed Mohamed, Astoria, NY (US)

(73) Assignee: LINKA GROUP LTD., Hong Kong (HK)

( * ) Notice: Subject to any disclaimer, the term of this patent is extended or adjusted under 35 U.S.C. 154(b) by 0 days.

(21) Appl. No.: 15/804,373

(22) Filed: Nov. 6, 2017

(51) Int. Cl.
| *B62K 19/34* | (2006.01) |
| *B62H 5/14* | (2006.01) |
| *B62J 99/00* | (2009.01) |
| *B62H 5/20* | (2006.01) |

(52) U.S. Cl.
CPC ............... *B62H 5/14* (2013.01); *B62H 5/20* (2013.01); *B62J 99/00* (2013.01); *B62K 19/34* (2013.01); *B62J 2099/004* (2013.01)

(58) Field of Classification Search
CPC ... B62H 5/14; B62H 5/20; B62J 99/00; B62K 19/34
USPC ........................................... 280/288.3, 288.4
See application file for complete search history.

(56) References Cited

U.S. PATENT DOCUMENTS

| 5,133,568 A * | 7/1992 | Balterman | B62H 5/14 224/420 |
| 5,538,167 A * | 7/1996 | Winner | B62J 11/00 224/425 |
| 5,709,113 A * | 1/1998 | Godfrey | B62H 5/00 70/227 |
| 7,631,525 B1 * | 12/2009 | Kennealy | B62H 5/141 70/227 |
| 9,228,377 B1 * | 1/2016 | Chang | B62H 5/003 |
| 9,512,649 B2 * | 12/2016 | Mohamed | B62H 5/147 |
| 2008/0018440 A1 * | 1/2008 | Aulbers | B62H 5/00 340/432 |
| 2010/0212379 A1 * | 8/2010 | Lee | B62H 5/145 70/227 |
| 2012/0080865 A1 * | 4/2012 | Chen | B62H 5/14 280/276 |

(Continued)

FOREIGN PATENT DOCUMENTS

| DE | 102016010962 A1 * | 3/2017 | B62M 6/50 |
| EP | 1818246 A2 * | 8/2007 | B62H 5/147 |

(Continued)

*Primary Examiner* — Jacob D Knutson
(74) *Attorney, Agent, or Firm* — Kanika Radhakrishnan; Evergreen Valley Law Group

(57) ABSTRACT

A bicycle includes a frame and an electronic security device. The frame includes a hollow space and at least one opening. The hollow space is configured within the frame. The at least one opening is configured in the frame and the at least one opening is connected to the hollow space. The electronic security device is configured such that it is accommodated within the hollow space of the frame. The electronic security device includes a retractable locking shackle configured to assume a locked position and a retracted position by moving through the at least one opening configured in the frame. The locked position of the retractable locking shackle restricts a movement of a wheel of the bicycle and the retracted position enables free movement of the wheel of the bicycle.

19 Claims, 7 Drawing Sheets

(56) References Cited

U.S. PATENT DOCUMENTS

| | | | |
|---|---|---|---|
| 2013/0214506 A1* | 8/2013 | Vollmer | B62K 19/34 280/281.1 |
| 2016/0090754 A1* | 3/2016 | Mohamed | B62H 5/147 70/15 |
| 2016/0221627 A1* | 8/2016 | Hines | B62H 5/20 |
| 2016/0280300 A1* | 9/2016 | Latzke | B62J 6/04 |

FOREIGN PATENT DOCUMENTS

| | | | | |
|---|---|---|---|---|
| EP | 2159138 A1 | * | 3/2010 | B62H 5/147 |
| GB | 595605 A | * | 12/1947 | B62H 5/142 |

* cited by examiner

ELECTRONIC SECURITY DEVICE FOR A BICYCLE

TECHNICAL FIELD

The present invention relates to an electronic security device for a bicycle, and more particularly, relates to an electronic security device embedded inside a frame of the bicycle.

BACKGROUND

Conventionally, bicycles are secured using locks by bicycle riders for preventing theft of bicycles. Although, conventional locks provide security to the bicycle, such locks still remain susceptible to tampering and other intrusions. These conventional locks are fairly conspicuous and are easily accessible by any unauthorized person. Moreover, losing keys or forgetting codes (combination of numbers) to unlock the conventional locks require replacement of the conventional locks, which leads to unnecessary expenses.

Recently, electronic security devices are increasingly used for securing the bicycles. Still, these security devices are conspicuous and susceptible to tamper. Further, performance of the conventional locks or the electronic security devices is also affected by dust or water seepage. Moreover, such placement of conventional locks or the electronic security devices tend to spoil the aesthetics of the bicycle.

In view of the above, there is a requirement for an electronic security device for the bicycle that provides utmost security to the bicycle and is not easily accessible by an unauthorized person without affecting the aesthetics of the bicycle.

SUMMARY

In an embodiment a bicycle is disclosed. The bicycle includes a frame and an electronic security device. The frame includes a hollow space and at least one opening. The hollow space is configured within the frame. The at least one opening is configured in the frame and the at least one opening is connected to the hollow space. The electronic security device is configured within the hollow space of the frame. The electronic security device includes a retractable locking shackle configured to assume a locked position and a retracted position by moving through the at least one opening configured in the frame. The locked position of the retractable locking shackle restricts a movement of a wheel of the bicycle and the retracted position enables free movement of the wheel of the bicycle.

In another embodiment, a bicycle is disclosed. The bicycle includes a chain stay and an electronic security device. The chain stay is operatively coupled to a rear wheel of the bicycle. The chain stay includes a hollow space and at least one opening. The hollow space is configured within the chain stay and the at least one opening is connected to the hollow space. The electronic security device is configured to be accommodated within the hollow space. The electronic security device includes a retractable locking shackle configured to move through the at least one opening to assume a locked position and a retracted position based on receipt of one or more user signals from a user device. In the locked position at least a portion of the retractable locking shackle is extended outwardly from the hollow space though the at least one opening to overlap with spokes of the rear wheel thereby restricting movement of the rear wheel. In the retracted position the retractable locking shackle is within the hollow space thereby not overlapping with the spokes of the rear wheel.

In another embodiment, a bicycle is disclosed. The bicycle includes a seat stay and an electronic security device. The seat stay is operatively coupled to a rear wheel of the bicycle. The seat stay includes a hollow space and at least one opening. The hollow space is configured within the seat stay and the at least one opening is connected to the hollow space. The electronic security device is configured to be accommodated within the hollow space. The electronic security device includes a retractable locking shackle configured to move through the at least one opening to assume a locked position and a retracted position based on receipt of one or more user signals from a user device. In the locked position at least a portion of the retractable locking shackle is extended outwardly from the hollow space though the at least one opening to overlap with spokes of the rear wheel thereby restricting movement of the rear wheel. In the retracted position the retractable locking shackle is within the hollow space thereby not overlapping with the spokes of the rear wheel.

BRIEF DESCRIPTION OF FIGURES

The invention itself, together with further features and attended advantages, will become apparent from consideration of the following detailed description, taken in conjunction with the accompanying drawings. One or more embodiments of the present invention are now described, by way of example/s only, with reference to the accompanied drawings wherein like reference numerals represent like elements and in which.

Figure 1:
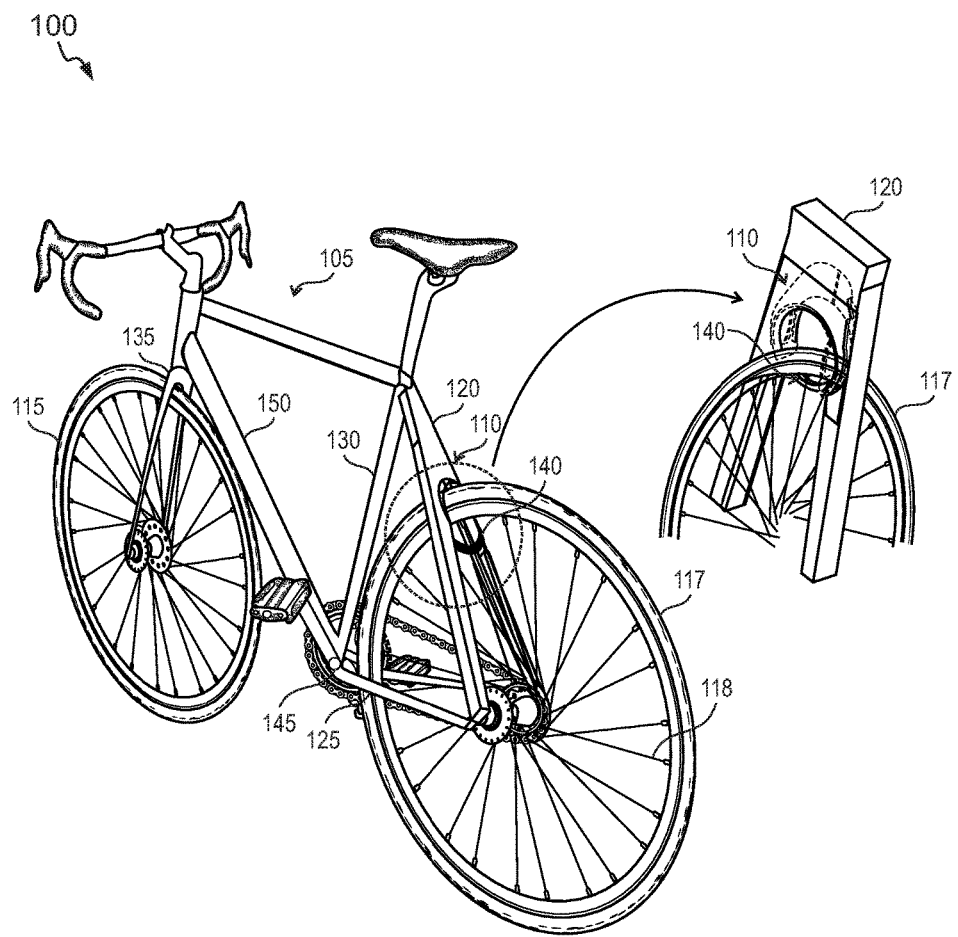
FIG. 1 illustrates a schematic representation of a bicycle showing an electronic security device and an enlarged representation thereof, in accordance with an example embodiment of the present disclosure.

The drawings referred to in this description are not to be understood as being drawn to scale except if specifically noted, and such drawings are only exemplary in nature.

DETAILED DESCRIPTION

While the invention is susceptible to various modifications and alternative forms. Specific embodiments thereof have been shown with the help of examples in the drawings and are described in detail below. It should be understood, however that it is not intended to limit the invention to the particular forms disclosed, but on the contrary, the invention is to cover all modifications, equivalents, and alternative fallings within the spirit and the scope of the invention.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. For the better understanding of this disclosure, reference will now be made to the embodiments illustrated in greater depth in the accompanying figures and description given below. In the following figures, the same reference numerals are used to identify the same components in various views.

Various embodiments provide different configurations for embedding an electronic security device within a frame. The electronic security device is disposed in a hollow space of the frame and is configured to lock/unlock the bicycle, thereby preventing theft of the bicycle. In addition, the electronic security device is configured to communicate with an external system. The external system is at least one of an external server or a user device associated with a user of the bicycle. For the purpose of the present disclosure, the terms 'user' and 'rider' have been used interchangeably throughout the present description and refer to a person accessing the electronic security device to lock/unlock the electronic security device that secures the bicycle.

The frame may be any frame of the bicycle such as a front fork, a head tube, a top tube, a down tube, a seat tube, a seat stay, a bottom bracket and a chain stay. In an embodiment, the chain stay includes a hollow space configured to accommodate and embed the electronic security device therein. Alternatively, one of the front fork, the head tube, the down tube, the seat tube, the seat stay or the bottom bracket comprise the hollow space for embedding the electronic security device. The electronic security device includes a retractable locking shackle that is configured to assume a locked position and a retracted position. The locked position of the retractable locking shackle restricts motion of at least one wheel of the bicycle and in the retracted position the retractable locking shackle allows free motion of the wheels of the bicycle. In an embodiment, an electronic control module is disposed inside the frame of the bicycle. The electronic control module is electrically coupled to the electronic security device and is configured to control the locked position and the retracted position of the locking shackle. The electronic control module is configured to wirelessly connect to a user device associated with the user for controlling the electronic security device. The electronic control module is configured to actuate the retractable locking shackle on receiving an unlock/locking call (e.g., one or more user signals such as a lock signal and an unlock signal) from the user device. The electronic security device includes a rechargeable battery that is configured to provide power to components of the electronic security device. In an embodiment the rechargeable battery can be disposed anywhere in the frame.

FIG. 1 illustrates a schematic representation of a bicycle 100 showing an electronic security device 110 and an enlarged representation thereof, in accordance with an example embodiment of the present disclosure. The electronic security device 110 is embedded within a hollow space created inside a frame 105 of the bicycle 100 such that a retractable locking shackle 140 of the security device 110 is configured to assume a locked position and a retracted position. The frame 105 can be any such component of the bicycle 100 which has sufficient inner space to accommodate the security device 110 such that the locking shackle 110 can restrict/allow a movement of at least one of a front wheel 115 or a rear wheel 117. For instance, the frame 105 as shown in FIG. 1 is a seat stay 120 in which the security device 110 is embedded including the retractable locking shackle 140. In the illustrated embodiment, the retractable locking shackle 140 in the locked position obstructs the movement of the rear wheel 117, and allows a free movement of the rear wheel 117 in the retracted position.

The frame 105 may take other examples as well that that of shown in FIG. 1. For instance, the frame 105 can either be a chain stay 125, a seat tube 130, a front fork 135, or a down tube 150. Any of these frame components (e.g., the chain stay 125, the seat tube 130, the front fork 135, or the down tube 150) can be configured with a hollow space so that the security device 110 can be accommodated therein. It will be understood that such positioning of the security device 110 can restrict/allow movement of at least one of the front wheel 115 or the rear wheel 117. For instance, when the security device 110 is embedded in the front fork 135 or the down tube 150, the security device 110 restricts or allows the movement of the front wheel 115. Similarly, when the security device 110 is embedded in the chain stay 125 or the seat tube 130, the security device 110 restricts or allows the movement of the rear wheel 117.

In this example representation, the electronic security device 110 is configured within a hollow space of the seat stay 120 (of the frame 105). However, it must be noted that the electronic security device 110 can be configured in any hollow space of the frame 105 such as the chain stay 125, the seat tube 130, the front fork 135, a bottom bracket 145 or the down tube 150 of the frame 105.

Figure 2:
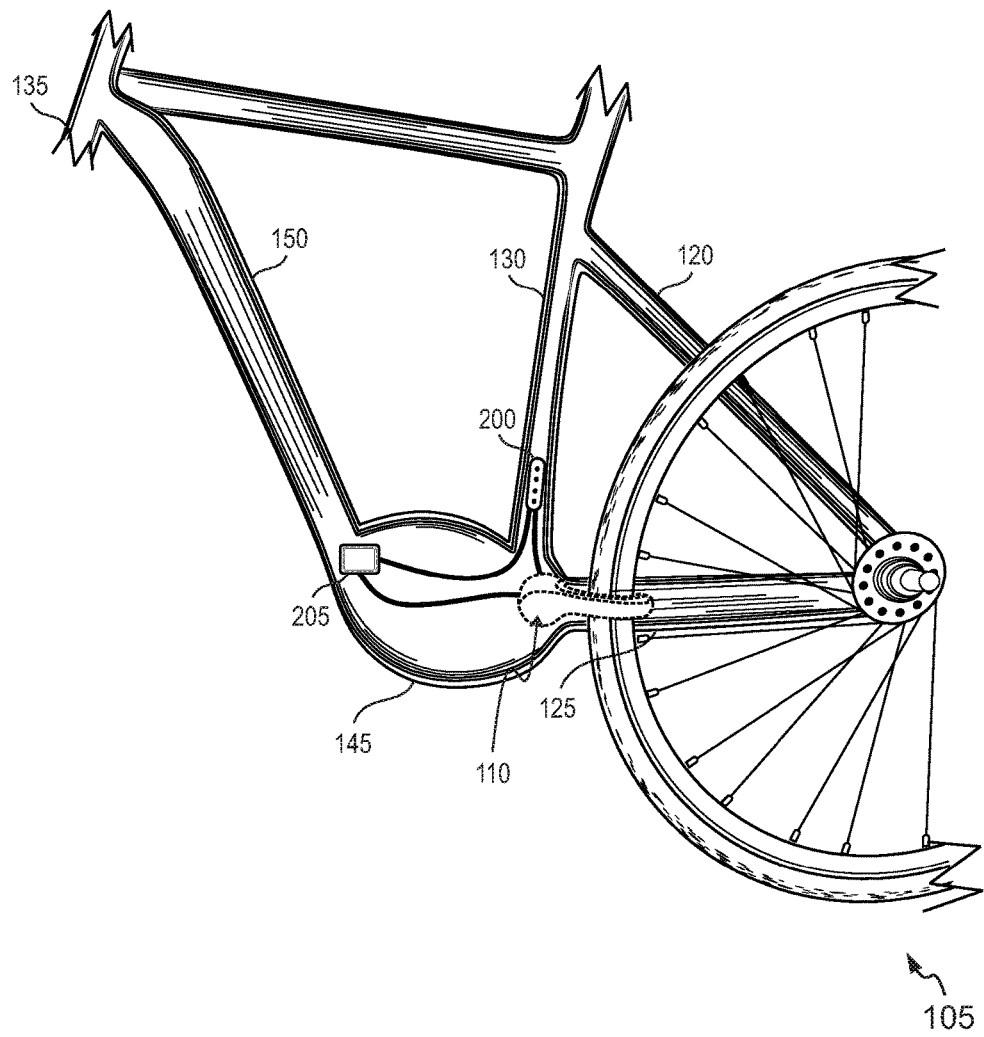
FIG. 2 illustrates a schematic representation of a side view of a portion of a frame, in accordance with an example embodiment of the present disclosure.

FIG. 2 is a schematic representation of a side view of the frame 105 showing the embedded security device 110, in accordance with an example embodiment of the present invention. The frame 105 includes the seat stay 120, the chain stay 125, the seat tube 130, the front fork 135, the bracket member 145 and the down tube 150. In the illustrated figure, the electronic security device 110 is shown as embedded inside the chain stay 125. The bicycle 100 also includes a charging port 200 and an electronic control module 205. In an embodiment, the charging port 200 can be disposed anywhere on the frame 105 and the positioning of the charging port 200 in the seat tube 130 is merely as example representation. The charging port 200 is electrically coupled to charge a rechargeable battery (not shown in FIG. 2) of the electronic security device 110. It must be noted that the rechargeable battery can be disposed anywhere on the frame 105 and is electrically coupled to the electronic security device 110 for powering components of the electronic security device 110 for its operation. Examples of the charging port 200 can include, but are not limited to, a micro-USB, a USB-c, a pogo pin port or an inductive charging port. The charging port 200 may be a solar panel disposed on the frame 105 or embedded inside the frame 105 of the bicycle 100. The solar panel includes a charge controller that is electrically coupled to the rechargeable battery (not shown in FIG. 2) of the electronic security device 110 and is configured to recharge the rechargeable battery.

The charging port 200 can be connected to an external source, such as a battery or an external power supply, for charging the rechargeable battery of the electronic security device 110. The rechargeable battery is configured to power components of the electronic security device 110. The rechargeable battery is further explained with reference to FIG. 3. The electronic control module 205 is electrically coupled to the charging port 200 and the electronic security device 110. The electronic control module 205 is configured with a variety of electrical and electronic components and enables communication with external systems such as user's mobile phone, and is described in detail with reference to FIG. 5.

In this example representation of FIG. 2, the electronic security device 110 (shown with dashed lines) is configured within a hollow space of the chain stay 125 of the frame 105. Alternatively, the electronic security device 110 can be configured anywhere within a hollow space of the frame 105 such as the seat stay 120, the seat tube 130, the front fork 135 and the bottom bracket 145.

Figure 3:
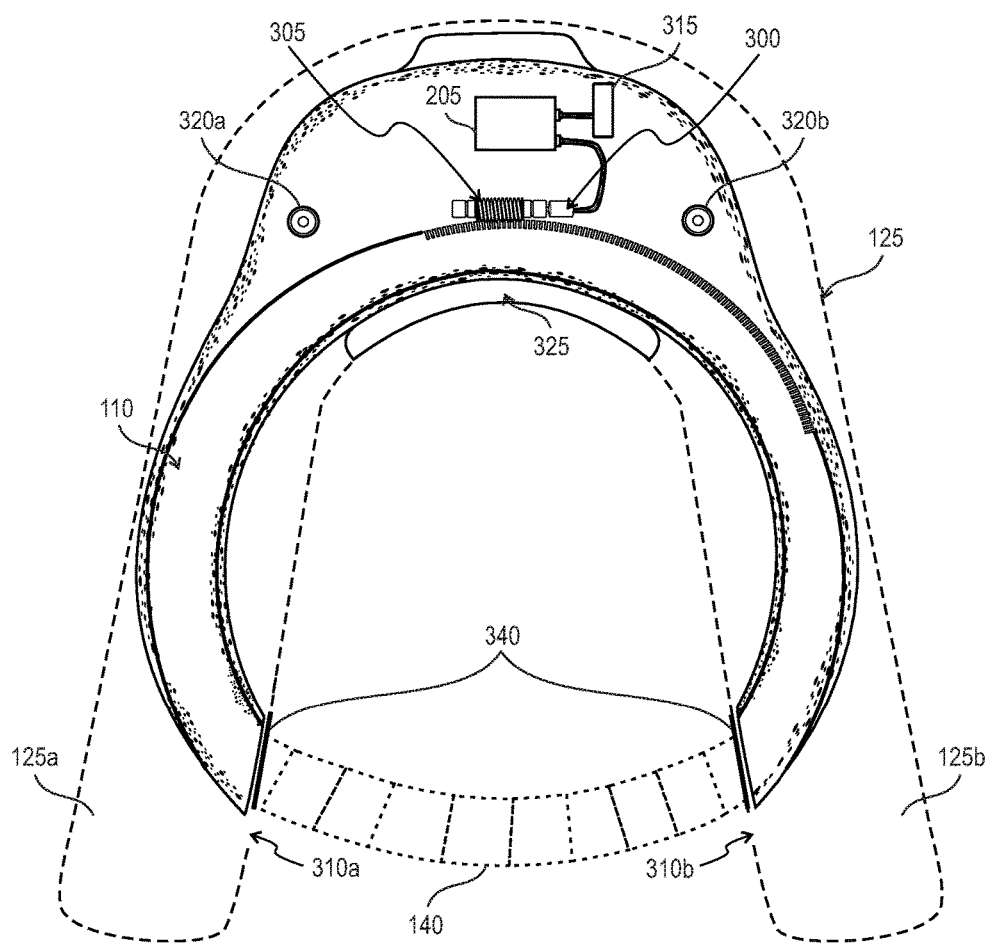
FIG. 3 illustrates a schematic diagram of the electronic security device embedded in a chain stay, in accordance with an example embodiment of the present disclosure.

FIG. 3 illustrates a schematic diagram of the electronic security device 110 disposed inside the frame 105 such as the chain stay 125, in accordance with an example embodiment of the present disclosure. The electronic security device 110 includes a motor 300, a worm gear 305, the retractable locking shackle 140, a rechargeable battery 315, the electronic control module 205, one or more fastening means 320a, 320b and a protective means 325.

The electronic security device 110 is configured within a hollow space of the chain stay 125 of the frame 105. The electronic security device 110 is mounted in the hollow space of the frame 105 using one or more fastening means for example fastening means 320a, 320b. The fastening means 320a, 320b can be at least one of screws, rivets or clips. In an embodiment, the protective means 325 protects the electronic security device 110 inside the frame 105 from damages caused by impacts while riding the bicycle 100. In addition, the protective means 325 helps in reduction of rattling noise when the bicycle security device 110 hits against the chain stay 125. The protective means 325 can be configured to any suitable material including but not limited to cushions, springs or bumpers.

The frame 105 for example the chain stay 125 includes at least one opening (see, openings 310a and 310b) for the retractable locking shackle 140 to assume at least one of the locked position and the retracted position by moving through the at least one opening 310a, 310b. The opening 310a, 310b are connected to the hollow space of the frame 105, and provide a passage for the movement of the retractable locking shackle 140. In the locked position, the retractable locking shackle 140 restricts the motion of at least one of the wheels 115, 117 of the bicycle 100 and in the retracted position, the retractable locking shackle 140 enables the free movement of the wheels of the bicycle 100.

In an embodiment, the electronic security device 110 includes one or more water shields 340. The water shields 340 are disposed on the inner side of the frame 105 near the openings 310a, 310b and act as sealing agent between surface of the frame 105 and retractable locking shackle 140. Such arrangement is configured to prevent water ingress into the electronic security device 110. However, the water shields 340 are made of thin material for allowing free movement of the retractable locking shackle 140 from the locked position to the retracted position and vice versa. In one configuration, the water shields 340 can be a flap like structure made up of plastic or rubber having a cut in the middle portion. When the retractable locking shackle 140 is in retracted position, the flap structure covers the openings 310a or 310b. When the retractable locking shackle 140 is actuated to assume the locked position, the retractable locking shackle 140 passes through the cut in the middle portion of the flap like structure of the water shield 340.

In an embodiment, the electronic control module 205 is disposed as part of the electronic security device 110. Alternatively the electronic control module 205 can be disposed anywhere on the frame 105 or inside the frame 105 of the bicycle 100, and is electrically or electronically connected to the motor 300 of the security device 110. The electronic control module 205 is communicably coupled to a user device for example a mobile phone of the user. The electronic control module 205 is configured to actuate the retractable locking shackle 140 on receiving a lock/unlock call (e.g., one or more user signals such as a lock signal and an unlock signal) from the user device.

The rechargeable battery 315 of the electronic security device 110 is charged by at least one of one of an external battery (e.g., e-bike battery) present in the bicycle 100 or the charging port 200. The rechargeable battery 315 is configured to power the components of the electronic security device 110 such as the motor 300. Upon actuation the motor 300, the motor 300 is configured to transmit rotational motion to the worm gear 305. The worm gear 305 is configured to actuate motion of the retractable locking shackle 140 through the worm threads of predetermined length disposed on a portion of the circumference of the retractable locking shackle 140.

The retractable locking shackle 140 can be configured to assume the locked position and the retracted position by moving through the first opening 310a and the second opening 310b of the frame 105. For instance, when the retractable locking shackle 140 is actuated from the retracted position, the retractable locking shackle 140 moves outwardly from the opening 310a configured in a first arm 125a of the chain stay 125 and reaches till or slightly within the opening 310b configured in a second arm 125b of the chain stay 125. As per the configuration of the bicycle 100, the rear wheel 117 lies within the first arm 125a and the second arm 125b, and hence in the locked position, the retractable locking shackle 140 obstructs movement of the rear wheel 117. In one alternate embodiment, the opening 310b may not be needed in the second arm 125b. In such configuration, the retractable locking shackle 140 exits from the opening 310a and reaches close to the surface of the second arm 125b such that it obstructs with spokes 118 of the rear wheel 117 (e.g., at least a portion of the locking shackle overlaps with the spokes of the wheel 117 so that the movement of the wheel 117 is restricted).

There may be various configurations of the retractable locking shackle 140 and the openings 310a and/or 310b. For example, in one non-limiting implementation, the electronic security device 110 is in the locked position (restricting wheel movement) when the retractable locking shackle 140 moves in a clockwise direction through the opening 310*a* and 310*b*, and movement of the retractable locking shackle 140 in an anti-clockwise direction retracts the retractable locking shackle 140 thereby keeping the electronic security device 110 in the retracted position. Alternatively, the retractable locking shackle 140 can be configured to retract (retracted position) when the retractable locking shackle 140 moves in clockwise direction through the openings 310*a* and 310*b* and assume the locked position when the retractable locking shackle 140 moves in the anti-clockwise direction.

In at least one embodiment, the electronic security device 110 can be completely mechanical and the motor 300 can be actuated upon pushing a push button disposed anywhere on the frame 105. Alternatively, the motor 300 can be actuated upon verification of the identity of the user. For instance, biometric fingerprint scanning can be used to verify identity of the user accessing the electronic security device 110 for actuating the motor 300.

Figure 4A:
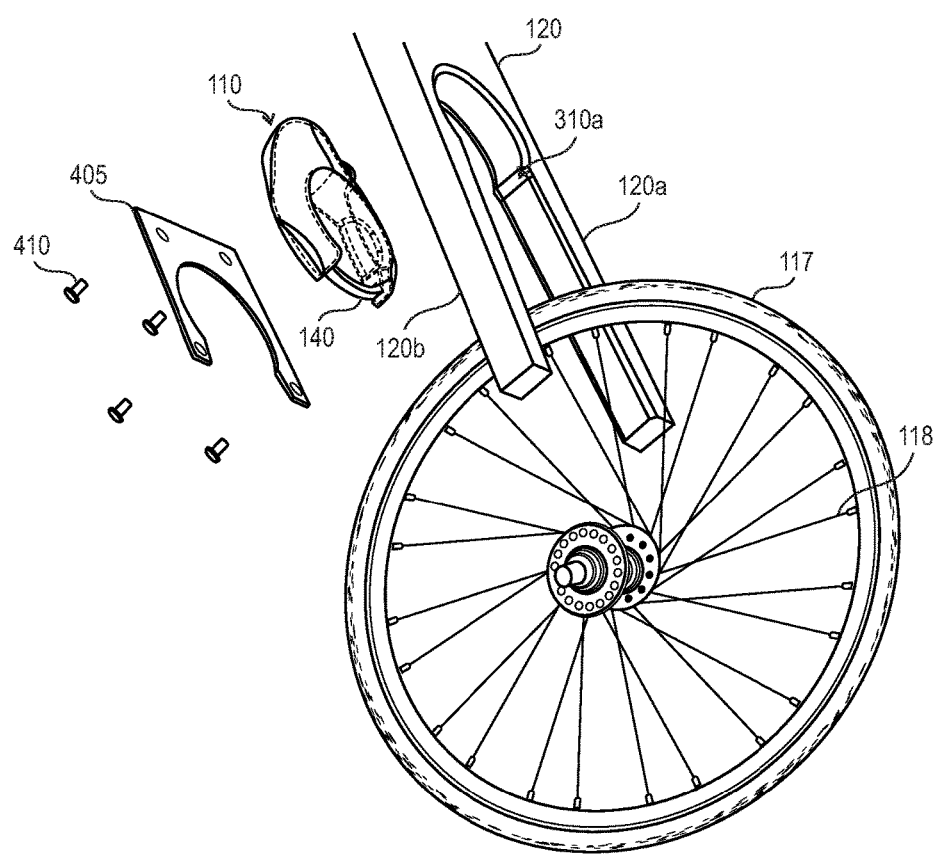
FIG. 4A illustrates an exploded view of the of the electronic security device embedded inside the frame, in accordance with an example embodiment of the present disclosure.
Figure 4B:
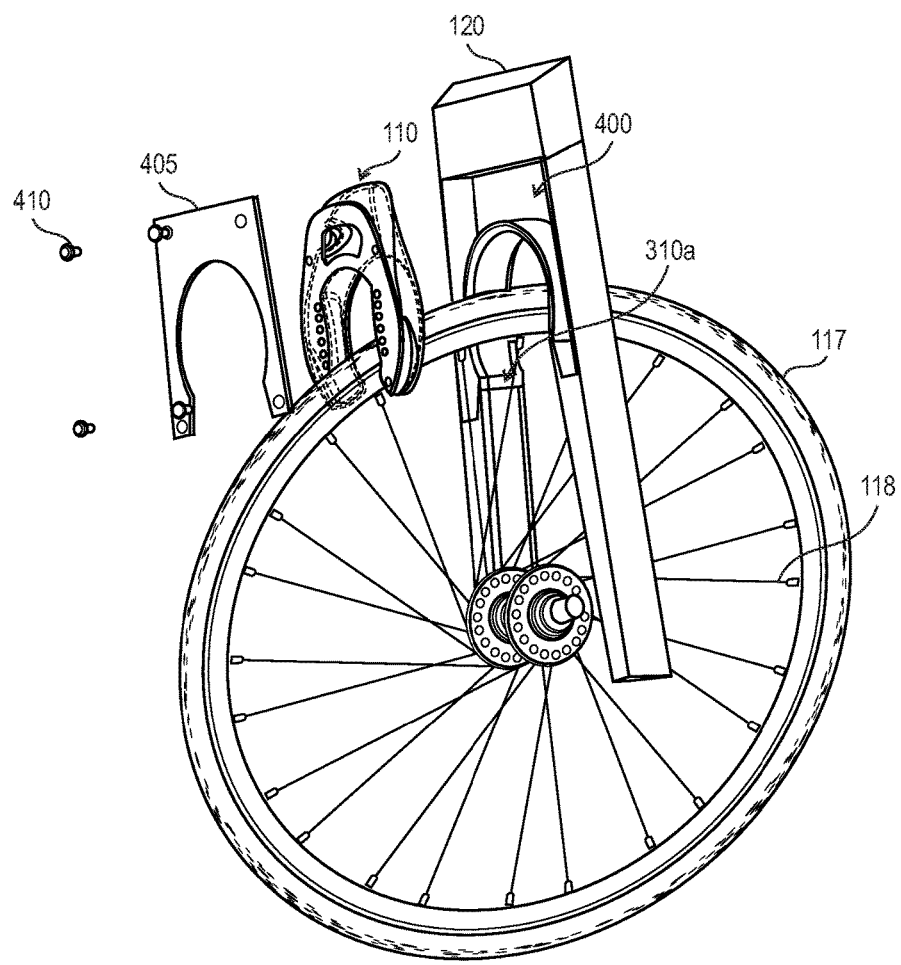
FIG. 4B illustrates an exploded view of the of the electronic security device embedded inside the frame, in accordance with another example embodiment of the present disclosure.

FIGS. 4A and 4B illustrate exploded views of the electronic security device 110 embedded inside the frame 105, in accordance with an embodiment of present disclosure. Herein, the example of the frame 105 is the seat stay 120. The seat stay 120 includes a hollow space 400 configured within the seat stay 120 to accommodate the electronic security device 110. The seat stay 120 includes openings 310*a* and 310*b* (not shown in FIGS. 4A and 4B) and a frame cap 405. The electronic security device 110 includes the retractable locking shackle 140 that is configured to move through the openings 310*a* and 310*b* of the frame 105 to assume the locked position and the retracted position.

The retractable locking shackle 140 can be configured to assume the locked position and the retracted position by moving through the first opening 310*a* and the second opening 310*b* of the frame 105. For instance, when the retractable locking shackle 140 is actuated from the retracted position upon receipt of a lock signal from the user device, the retractable locking shackle 140 moves outwardly from the opening 310*a* configured in a first arm 120*a* of the seat stay 120 and reaches till or slightly within the opening 310*b* configured in a second arm 120*b* of the seat stay 120. As per the configuration of the bicycle 100, the rear wheel 117 lies within the first arm 120*a* and the second arm 120*b*, and hence in the locked position, the retractable locking shackle 140 obstructs movement of the rear wheel 117. In one alternate embodiment, the opening 310*b* may not be needed in the second arm 120*b*. In such configuration, the retractable locking shackle 140 exits from the opening 310*a* and reaches sufficiently close to the surface of the second arm 120*b* so as to obstruct with spokes 118 of the rear wheel 117 (e.g., at least a portion of the locking shackle overlaps with the spokes of the wheel 117 so that the movement of the wheel 117 is restricted).

The electronic security device 110 is mounted in the hollow space 400 of the seat stay 120 by using one or more fastening means 410. The fastening means 410 can be at least one of screws, rivets or clips. The frame cap 405 is removably coupled to the frame 105. The frame cap 405 covers the electronic security device 110 after the electronic security device 110 is disposed in the hollow space 400. The frame cap 405 protects the electronic security device 110 from unfavorable weather conditions and prevents tampering of the electronic security device 110. Further, the frame cap 405 provides easy access to the hollow space 400 for installation and maintenance of the electronic security device 110.

Figure 5:
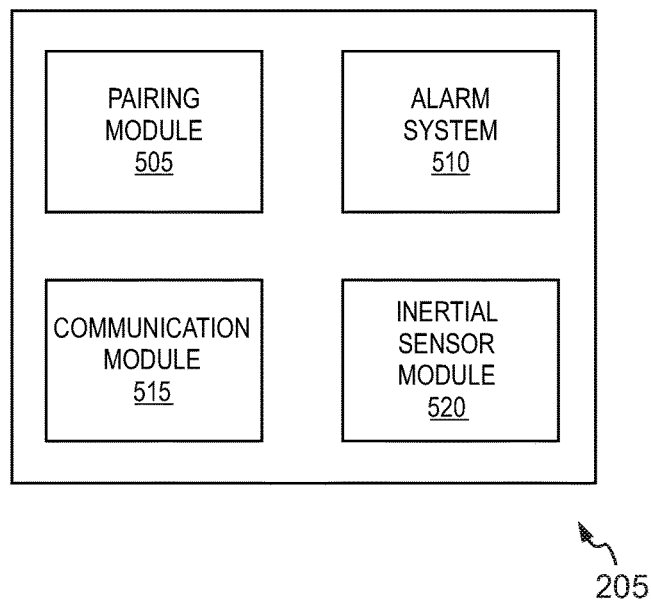
FIG. 5 illustrates a schematic representation of components of an electronic control module, in accordance with an example embodiment of the present disclosure.

FIG. 5 illustrates a schematic representation of components of the electronic control module 205. The electronic control module 205 is electrically coupled to the electronic security device 110 and is configured to control the operations of the electronic security device 110. In an embodiment, the electronic control module 205 is disposed within the electronic security device 110. However, the electronic control module 205 can be disposed anywhere inside the frame 105 and electrically coupled to the electronic security device 110 for controlling the operations of the electronic security device 110. For instance, the user associated with the user device can send a unlock call to the electronic control module 205 to retract the retractable locking shackle 140. The electronic control module 205 initiates the motor 300 (shown in FIG. 3) that actuates the retractable locking shackle 140 to move to the retracted position.

The electronic control module 205 includes a pairing module 505, an alarm system 510, a communication module 515 and an inertial sensor module 520. The electronic control module 205 is communicably coupled to the user device (not shown in FIG. 5) associated with the user via the communication module 515. The electronic control module 205 is configured to control locking and unlocking of the electronic security device 110. The pairing module 505 is securely paired with the user device through at least one of a Global System for Mobile Communication (GSM) protocol, Long Term Evolution (LTE) protocol, Bluetooth protocol or any narrowband or short range communication protocol for actuating the motor 300 to retract or lock the retractable locking shackle 140 on receiving the lock/unlock call from the user device. For example, the pairing module 505 is securely paired with a Bluetooth module of the user device for actuating the motor 300 to retract the retractable locking shackle 140 or to cause the retractable locking shackle 140 to assume the locked position.

Any unauthorized forced movement of the bicycle 100 is detected by the inertial sensor module 520 and the alarm system 510 is activated. The alarm system 510 sends a notification to the user device associated with the user and alerts bystanders through an alarm sound. However, it must be noted that the components 505, 510, 515 and 520 have been shown for example purposes only and the electronic control module 205 may comprise fewer or more components based on intended application.

Figures 6A, 6B:
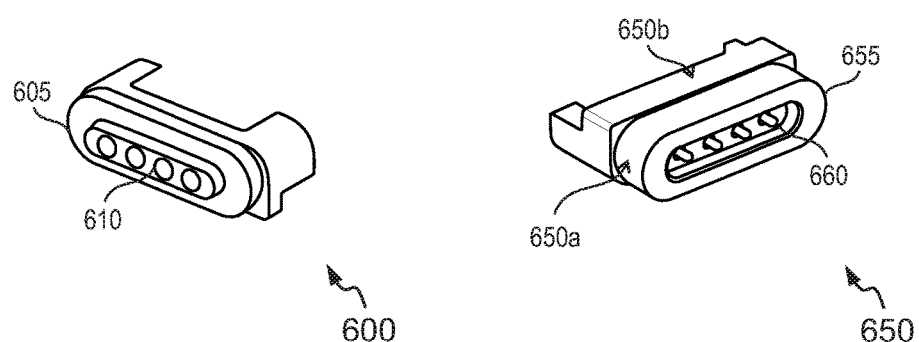
FIG. 6A illustrates a perspective view of a first charging port connector, in accordance with an example embodiment of the present disclosure.
FIG. 6B illustrates a perspective view of a second charging port connector, in accordance with an example embodiment of the present disclosure.

FIG. 6A illustrates a perspective view of a first charging port connector 600, in accordance with an example embodiment of the present disclosure. In an embodiment, the first charging port connector 600 is an example of the charging port 200 disposed on the frame 105 of the bicycle 100. The first charging port connector 600 can be disposed anywhere on the frame 105 or on the electronic security device 110 (shown in FIG. 3). The charging port connector 600 includes a magnetic shroud 605 and a plurality of pins 610. In an embodiment, the pins 610 are pogo pin connectors. The magnetic shroud 605 and the plurality of pins 610 connectors facilitate the engagement of the first charging port connector 600 with different pin connectors, such as second charging port connectors 650 shown and explained with reference to FIG. 6B.

FIG. 6B illustrates a perspective view of a second charging port connector 650, in accordance with an example embodiment of the present disclosure. The second charging port connector 650 includes a first end 650*a* and a second end 650*b*. The first end 650*a* includes a magnetic shroud 655 and one or more pins 660 configured to engage with the one or more pins 610 of the first charging port connector 600. In an embodiment, the one or more pins 660 are pogo pin connectors.

The second end 650b is configured as at least as one of micro-USB, mini-USB, USB-C connector or similar for connecting to a power supply. The charging port connector 650 is configured to plug into the charging port connector 600. The magnetic shroud 605 and 655 facilitate the engagement of the first charging port connector 600 with the second charging port connector 650. Upon engagement of the first charging port connector 600 with the second charging port connector 650, the one or more pins 610 and 660 are in contact with each other and the connection is used for charging any device connected to the first charging port connector 600. For instance, the first charging port connector 600 is electrically connected to the rechargeable battery 315 (shown in FIG. 3), and upon connecting the charging port connector 650 to the charging port connector 600, the rechargeable battery 315 is recharged.

Figure 7:
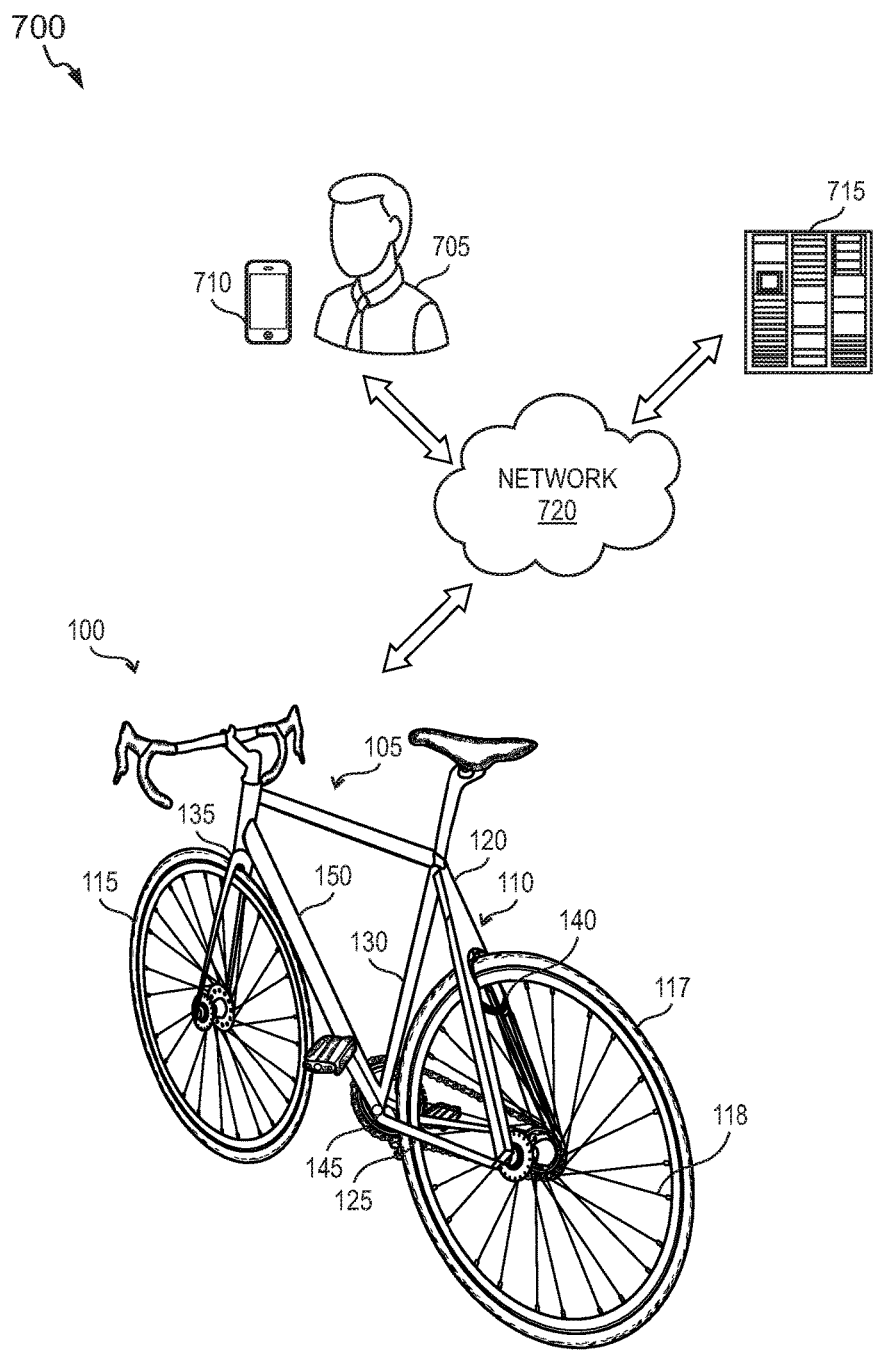
FIG. 7 illustrates an environment related to at least some example embodiments of the present disclosure.

FIG. 7 shows an environment 700 related to at least some embodiments of the present disclosure. The environment 700 shows the bicycle 100 having the frame 105, the electronic security device 110 and wheels 115, 117. The frame 105 includes the seat stay 120, the chain stay 125, the seat tube 130 and the front fork 135. In this example representation, the electronic security device 110 is configured within a hollow space, such as, the hollow space 400 (shown in FIGS. 4A and 4B) of the seat stay 120 of the frame 105. Alternatively, the electronic security device 110 can be configured within a hollow space of at least one of the chain stay 125, the seat tube 130 or the front fork 135 of the frame 105. The electronic security device 110 is configured to secure the bicycle 100 and prevent theft of the bicycle 100. The electronic security device 110 includes the retractable locking shackle 140 that is configured to assume a retracted position and a locked position, such that in the locked position the electronic security device 110 restricts motion of at least one of the wheels 115, 117 of the bicycle 100 and in the open position the electronic security device 110 allows free motion of the bicycle 100.

The electronic security device 110 is communicably linked with authorized devices of a user 705 using a network 720. For example, the user 705 may have one or more devices such as a user device 710. Examples of the user device 710 are not limited to mobile phones only, and the user device 710 may take examples of any portable electronic device (e.g., I-pods, laptops, smartphones and tablets) having cellular communication capabilities. For instance, the user device 710 may be equipped with subscriber identity module (SIM) or Removable User Identity Module (R-UIM) to enable cellular communication.

In an embodiment, the electronic security device 110 is configured to send information such as, tethering data, location data and notifications of tampering to an external system. The external system is at least one of an external server (such as a server 715) of an insurance provider or even the user device 120 associated with the user of the bicycle. This data is transmitted to the server 715 over the network 720. Further, the user 705 can send an unlock call from the user device 710 to the electronic security device 110 using the network 720. This requires secure pairing of the electronic security device 710 with the user device 120 for retracting the locking shackle from the locked position. The network 720 may be a centralized network or may include a plurality of sub-networks that may offer a direct or indirect communication between the electronic security device 110 and the server 715 and communication between the electronic security device 110 and the user device 710. Examples of the network 720 include, but are not limited to, the Internet, local area network (LAN), wide area network (WAN), wireless, wired, and the like. The server 715 may be located at one place or may be distributed at multiple locations. In some scenarios, if the user has lost or misplaced the user device 710, the user can access an application available with the server 715 to send lock/unlock signals to the electronic security device 110.

Various embodiments of the present disclosure advantageously provide a bicycle where an electronic security device can be disposed in the hollow space of the frame and embedded inside the frame. Further, a protecting means is configured within the hollow space to protect the electronic security device from any damage due to impacts inside the frame and water shields configured at the openings for the locking shackle to prevent any ingress of water into the electronic security device. Furthermore, the advantageous design of the frame facilitates easy installation and maintenance of the electronic security device. The aesthetics of the bicycle are preserved when the electronic security device is conveniently embedded inside the frame. Moreover, the electronic security device receives the lock/unlock call from a user device and cannot be accessed by any unauthorized person.

While few embodiments of the present disclosure have been described above, it is to be understood that the disclosure is not limited to the above embodiments and modifications may be appropriately made thereto within the spirit and scope of the disclosure.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A bicycle, the bicycle comprising:
   a frame;
   a hollow space configured within the frame;
   at least one opening configured in the frame, the at least one opening connected to the hollow space;
   an electronic security device configured to be accommodated within the hollow space of the frame, the electronic security device comprising a retractable locking shackle configured to assume a locked position and a retracted position by moving through the at least one opening configured in the frame,
   wherein the locked position of the retractable locking shackle restricts a movement of a wheel of the bicycle, and the retracted position enables a free movement of the wheel of the bicycle;
   a rechargeable battery for providing power to the electronic security device;
   a charging port for recharging the rechargeable battery,
   wherein the charging port comprises a first charging port connector disposed on the frame of the bicycle, the first charging port connector comprising one or more pins electrically coupled to the electronic security device; and
   a second charging port connector comprising a first end and a second end, the second end configured to be electrically coupled to a power source and the first end comprising one or more pins configured to engage with the one or more pins of the first charging port connector for charging the rechargeable battery.

2. The bicycle as claimed in claim 1, further comprising:
an electronic control module communicably coupled to the electronic security device, the electronic control module configured to provide a user signal to the electronic security device for assuming the locked position and the retracted position of the retractable locking shackle.

3. The bicycle as claimed in claim 1, wherein the charging port is at least one of a micro-USB, a USB-c, a pogo pin port, an inductive charging port or a solar panel.

4. The bicycle as claimed in claim 1, wherein the frame is a chain stay of the bicycle.

5. The bicycle as claimed in claim 1, wherein the frame is a seat stay of the bicycle.

6. The bicycle as claimed in claim 1, wherein the frame is a down tube of the bicycle.

7. The bicycle as claimed in claim 1, wherein the frame is a bottom bracket of the bicycle.

8. The bicycle as claimed in claim 1, wherein the frame is a front fork of the bicycle.

9. The bicycle as claimed in claim 1, further comprising:
at least one fastening means, the at least one fastening means configured to hold the electronic security device inside the hollow space of the frame; and
a protective means for protecting the electronic security device from impacts to the electronic security device inside the hollow space of the frame while movement of the bicycle.

10. The bicycle as claimed in claim 9, wherein the protective means is at least one of a cushion, a spring or a bumper.

11. The bicycle as claimed in claim 1, further comprising one or more water shields disposed at the at least one opening configured in the frame of the bicycle for preventing water ingress into the electronic security device.

12. A bicycle comprising:
a bottom bracket operatively coupled to a rear wheel of the bicycle, the bottom bracket comprising a hollow space configured within the bottom bracket and at least one opening connected to the hollow space; and
an electronic security device configured to be accommodated within the hollow space, the electronic security device comprising a retractable locking shackle configured to move through the at least one opening to assume a locked position and a retracted position based on receipt of one or more user signals from a user device,
wherein in the locked position at least a portion of the retractable locking shackle is extended outwardly from the hollow space though the at least one opening to overlap with spokes of the rear wheel thereby restricting movement of the rear wheel, and
wherein in the retracted position the retractable locking shackle is within the hollow space thereby not overlapping with the spokes of the rear wheel.

13. The bicycle as claimed in claim 12, wherein the at least one opening comprises a first opening and a second opening, the first opening configured in a first arm of the bottom bracket and the second opening configured in a second arm of the bottom bracket, the first arm and the second arm positioned such that the rear wheel lie therebetween.

14. The bicycle as claimed in claim 12, further comprising:
an electronic control module communicably coupled to the electronic security device, the electronic control module configured to provide a user signal to the electronic security device for assuming the locked position and the retracted position of the retractable locking shackle.

15. The bicycle as claimed in claim 12, wherein the bicycle further comprises:
a rechargeable battery for providing power to the electronic security device;
a charging port for recharging the rechargeable battery, wherein the charging port comprises a first charging port connector disposed on a frame of the bicycle, the first charging port connector comprising one or more pins electrically coupled to the electronic security device; and
a second charging port connector comprising a first end and a second end, the second end configured to be electrically coupled to a power source and the first end comprising one or more pins configured to engage with the one or more pins of the first charging port connector for charging the rechargeable battery.

16. A system comprising:
a hollow space configured within a bottom bracket connected to a rear wheel of a bicycle;
at least one opening configured in the bottom bracket, the at least one opening connected to the hollow space; and
an electronic security device configured to be accommodated within the hollow space of the bottom bracket, the electronic security device comprising a retractable locking shackle configured to
assume a locked position and a retracted position by moving through the at least one opening configured in the bottom bracket,
wherein the locked position of the retractable locking shackle restricts a movement of a wheel of the bicycle, and the retracted position enables a free movement of the wheel of the bicycle,
wherein the electronic security device further comprises
a battery for providing power to the electronic security device,
a worm gear, and
a motor,
wherein upon actuation the motor is configured to transmit rotational motion to the worm gear which in turn actuates motion of the retractable locking shackle to assume either the locked position or the retracted position.

17. The bicycle as claimed in claim 16, wherein the electronic security device further comprises at least one water shield disposed on the at least one opening, the at least one water shield covering the at least one opening when the retractable locking shackle is in the retracted position and when the retractable locking shackle is in the locked position then allowing free movement of the retractable locking shackle through a cut in a middle portion of the at least one water shield.

18. The bicycle as claimed in claim 16, wherein the motor is actuated upon biometric verification of a user.

19. The bicycle as claimed in claim 16, wherein the worm gear comprises worm threads of predetermined length disposed on a portion of the circumference of the retractable locking shackle.

\* \* \* \* \*